Aug. 23, 1927.
C. T. HIBBARD
1,640,321
STARTING SYSTEM FOR SYNCHRONOUS MOTORS
Filed July 19, 1924
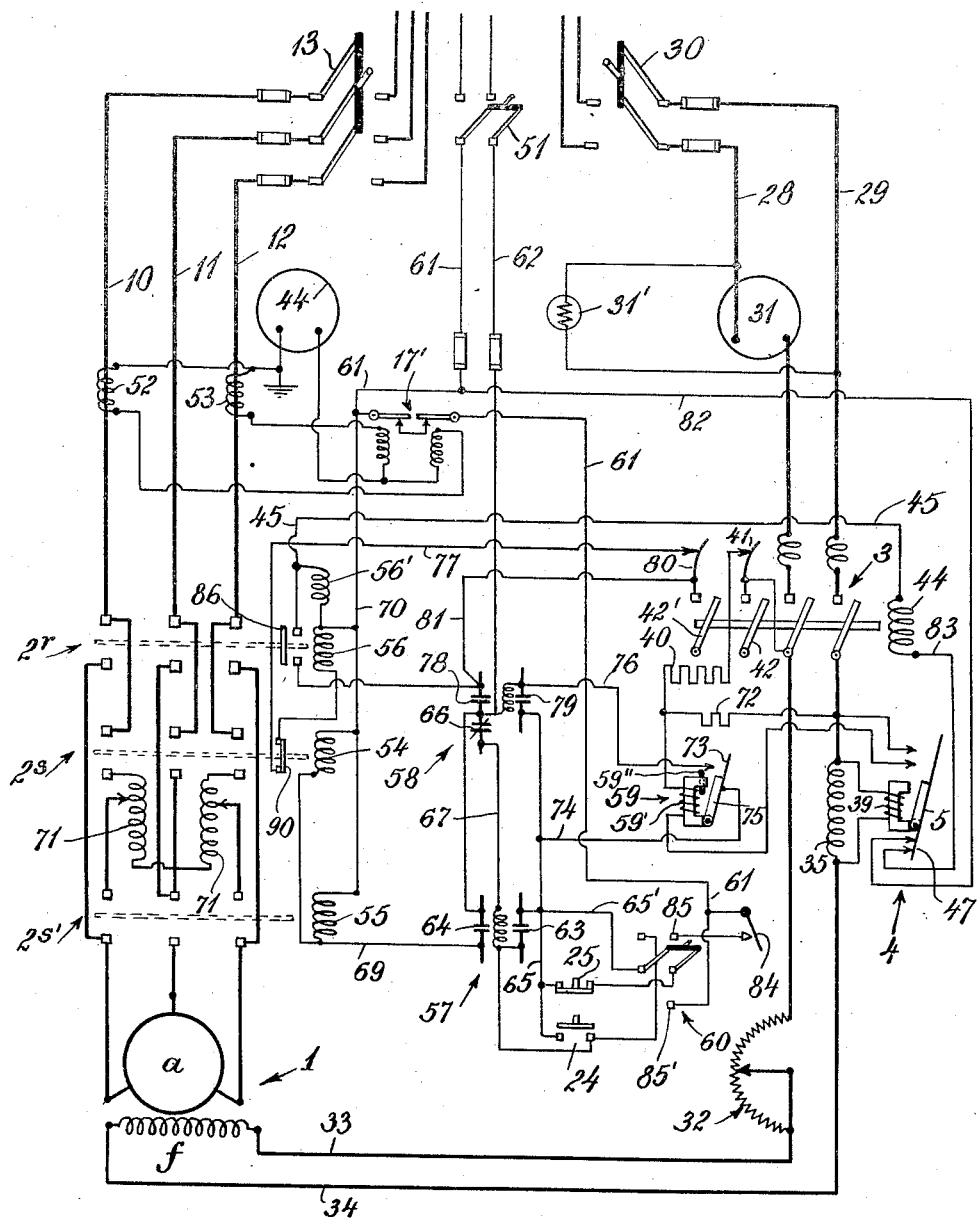
INVENTOR
Charles Truman Hibbard
BY
Cooie Davis Marvin & Edmonds
ATTORNEYS Patented Aug. 23, 1927.

1,640,321

UNITED STATES PATENT OFFICE.

CHARLES TRUMAN HIBBARD, OF MINNEAPOLIS, MINNESOTA, ASSIGNOR TO ELECTRIC MACHINERY MFG. COMPANY, OF MINNEAPOLIS, MINNESOTA, A CORPORATION OF MINNESOTA.

STARTING SYSTEM FOR SYNCHRONOUS MOTORS.

Application filed July 19, 1924. Serial No. 726,928.

This invention relates to starting systems for synchronous motors, this application being a continuation in part of my applications, Serial Number 352,159 filed January 17, 1920 and Serial Number 639,036 filed May 15, 1923. This invention comprises a starting system such that a synchronous motor, or other machine with which the system is used, can be started with a minimum of effort, ample provision being made for fully protecting the motor at all times.

A polyphase synchronous motor, a type of machine with which my starting system is particularly useful, can be started as an induction motor by making use of its damper winding. The starting torque is produced by the induced current in the damper winding and by the eddy current and hysteresis loss in the pole faces. A synchronous motor can never reach synchronous speed under the action of the currents induced in the damper winding alone, but if the damper winding is properly designed the motor can reach a speed which is near enough to the synchronous speed to permit the motor to pull into step before the field is excited. The lagging component of the starting current will easily produce sufficient field excitation to cause the motor to pull into step, if the motor is without load.

A synchronous motor, starting as an induction motor, should have a low resistance damper winding field rotor so as to pull into step easily. In order for the motor to start readily, especially under load, the resistance of the damper winding should be high. These conflicting requirements make it necessary to effect a compromise in order to give the motor reasonably satisfactory starting characteristics.

One of the objects of my invention is to provide a starting system especially adapted to be used with synchronous motors, the system being such that it is merely necessary to close a single contact in a control circuit in order to have the system operate to bring the motor up to speed and close the field circuit at the proper instant. This invention provides means whereby reduced voltage is first applied to the motor armature and then, after the motor attains a predetermined speed, full voltage is applied to the armature automatically. This invention can be employed to advantage in connection with means for applying the motor load after the motor has been brought up to speed and the field circuit is closed. This makes it possible to design the motor so that the resistance of the damper winding will be such as to permit the motor to pull into step readily.

In general my invention includes automatic means for applying reduced voltage to the motor armature and automatic means responsive to the internal electrical condition of the field winding of the motor for applying full voltage to the motor armature. The invention also includes means responsive to the electrical condition of the motor field winding for applying the field excitation at the proper instant so as to enable the motor to pull into step readily. The invention includes two frequency relays, one for closing the full voltage switch when the motor has attained a certain speed, and the other for closing the field circuit after the motor speed has reached a value near synchronous speed. The starting system can be set in operation by merely closing a single contact in the control circuit, this contact being preferably in the form of a push button which can be located at any convenient point, preferably near the motor.

The single figure of the accompanying drawing shows one embodiment of my invention as applied to a high tension three-phase synchronous motor, a low voltage control circuit being employed.

The accompanying drawing shows a synchronous motor 1 having an armature $a$ connected to high tension supply lines 10, 11 and 12 through two starting switches $2^s$, and $2^{s'}$ and a running switch $2^r$. The field $f$ is supplied with direct current through leads 28 and 29. A switch 13 serves to connect the armature supply leads 10, 11, 12 with a three-phase alternating current supply line, and a field switch 30 connects the leads 28, 29 to a source of direct current. An automatically controlled field switch 3 is interposed between the field winding $f$ and the switch 30. A switch 51 serves to connect a control circuit with a source of current, for example, to a 220 volt alternating current supply line.

The current supplied to the motor armature is measured by an ammeter 44' connected to current transformers 52 and 53. The current supplied to the ammeter 44' passes through an overload relay 17' adapted to break the control circuit above mentioned.

The two starting switches 2$^s$ and 2$^{s'}$ which serve to apply reduced voltage to the motor armature, are electromagnetic oil switches, the coils of which are indicated at 54 and 55. The control circuit supplies current to the coils 54 and 55 as well as to a coil 56 which forms a part of the electromagnetic switch 2$^r$ which applies full voltage to the motor armature. The control circuit includes a pilot or starting relay 57 and a control relay 58; and this circuit also includes a frequency relay 59 having a coil 59'.

The control circuit and the apparatus associated with the motor 1 can be set in operation by merely actuating a single contact switch such as a push-button switch. Two such switches 24 and 25 are shown in the accompanying drawing, the switch 24 being used in starting the motor and the switch 25 being actuated to stop the motor. A double throw switch 60 serves to connect one side of the switch 25 to one of the leads of the control circuit. The leads are shown at 61 and 62, and the switch 60 can be closed so as to connect one of the contacts of switch 25 with lead 61. The switch 25 is normally closed and when the double throw switch 60 is thrown downward, against contact 85', a through connection between the lead 61 and one of the contacts of the starting switch 24 is provided.

Upon closing the starting switch 24 current from lead 61 is supplied to the coil of the pilot relay 57 and then back to lead 62 thru the control relay 58. As soon as the coil of the pilot relay 57 is energized, contacts 63 and 64 of this relay are closed. Contacts 63 serve as a seal or shunt around the starting switch 24 thus making it unnecessary to hold the starting switch in its closed position. This shunt connection is completed through lead 65, contacts 63, lead 67, closed contacts 66 and lead 62.

As soon as the pilot relay 57 operates, contacts 64 of this relay are closed thus supplying current from lead 62 of the control circuit to coils 54 and 55 of the starting switches 2$^s$ and 2$^{s'}$. The current passes through these coils from lead 69, and the return connection to lead 61 is made through lead 70. This causes the oil switches 2$^s$ and 2$^{s'}$ to close whereupon reduced voltage, the value of which is determined by the auto transformer 71, is applied to the motor armature. The current from the main supply leads 10, 11 and 12 passes through switch 2$^s$, auto transformer 71 and switches 2$^s$ and 2$^{s'}$ to the motor armature.

As soon as current is supplied to the motor armature, the motor commences to operate as an induction motor. A current of line frequency is induced in the field winding $f$, the frequency decreasing as the motor speed increases. The induced field current flows through the lead 34, coil 39 of frequency relay 4, balancing resistance 72, resistance 40, switch 41 and back through rheostat 32 and lead 33 to the field winding. A reactance 35 is connected across the coil 39 of the frequency relay 4 so that this reactance is really in series with the field winding $f$. Because of the high frequency of the induced current in the field winding, part of the current which would otherwise flow through the reactance 35, flows through the coil 39 of the frequency relay 4. This causes the contact arm 5 of the frequency relay 4 to close immediately upon the closing of the main starting switches 2$^s$ and 2$^{s'}$. The operation of the frequency relay 4 connects the coil 59' of the frequency relay 59 in parallel with the balancing resistance 72. At first the flux produced by the coil 59' is not sufficient to operate the relay, for it is choked by the currents induced in the copper ring 59''. As the frequency of the induced field current decreases, the flux produced by coil 59' gradually builds up until it is sufficient to close the contacts 73 of this relay. The relay can, of course, be adjusted so that it will close when the speed of the motor and consequently, the frequency of the induced field current reaches any desired fraction of its normal value.

As soon as frequency relay 59 operates to close contacts 73, current is supplied to the coil of the control relay 58, this current flowing through lead 61, switch 60, switch 25, lead 65, lead 74, relay armature 75, contacts 73 and lead 76. From the coil of the control relay 58 current flows through lead 62. As soon as current flows through the coil of control relay 58, contacts 78 and 79 are closed and contacts 66 opened. The opening of contacts 66 breaks the seal which was established through contacts 63 of pilot relay 57. Current is no longer supplied to the coil of the pilot relay 57 and, therefore, contacts 63 and 64 open and the current through coils 54 and 55 of the starting switches 2$^s$ and 2$^{s'}$ is interrupted.

The closing of contacts 78 of the control relay 58 establishes a circuit through coil 56 of the running switch 2$^r$. The current flows from lead 62 of the control circuit through contacts 78, lead 81, switch 80, lead 77, contacts 90, coil 56, lead 70 and back to lead 61 of the control circuit. It is thus apparent that current cannot be supplied to the coil 56 of the electromagnetic switch 2$^r$ until the contacts 90 are closed. These contacts are not closed except when the starting switches 2$^s$ and 2$^{s'}$ are opened.

This insures against closing of the full voltage switch $2^r$ before the low voltage switches $2^s$ and $2^{s'}$ are open. This serves as an additional safeguard for it will be understood that the contacts 78 cannot close without opening contacts 66, which serves to interrupt the current supplied to the pilot relay 57. Therefore, if the switches $2^s$ and $2^{s'}$ are working properly they will open immediately upon the opening of contact 66. However, should they fail to open for any reason, the full voltage switch $2^r$ will not be closed because the contacts 90 will remain open. Contacts 79 when closed serve as a seal or shunt around the contacts 73 of the frequency relay 59, for as soon as contacts 79 are closed current from lead 61 is supplied to the coil of the control relay 58 directly through switches 60 and 25, lead 65 and contacts 79 instead of through lead 74 and the contacts of the frequency relay 59.

The closing of the frequency relay 59, therefore, marks the first step in the transition from starting to running conditions. The starting switches $2^s$ and $2^{s'}$ which served to supply reduced voltage to the motor are open and, at the same time, the running switch $2^r$ is closed thus supplying full voltage to the armature $a$. As the speed of the motor increases, the frequency of the induced field current decreases until ultimately the current passing through coil 39 of the frequency relay 4 is so low that the relay armature 5 is no longer held in its closed position. This relay 4 can be adjusted so that the armature 5 will be released at the proper instant after the motor speed has nearly reached its full value. As soon as the relay armature 5 moves to its open position the circuit through coil $59'$ of the other frequency relay 59 is broken and relay armature 75 moves to its open position. This movement of the relay armature 75 does not have any effect on the system, for as pointed out above the closing of contact 79 of control relay 58 completed a shunt circuit or seal around the contacts 73 upon the closing of the relay armature 75. The movement of the relay armature 5 of frequency relay 4 to its open position, in addition to breaking the circuit through relay coil $59'$, establishes a contact at 47 whereby current from lead 61 of the control circuit passes through lead 82, contacts 47, lead 83, coil 44 of field switch 3, lead 45 and back to lead 62 of the control circuit, through contacts 86 and 78. As soon as current flows through coil 44 of the field switch 3 this switch is closed thus supplying direct current from leads 28 and 29 to leads 33 and 34 connected to the main field winding $f$. Field switch 3 carries an extra arm 42 adapted to actuate a switch 41 so as to open this switch when the field switch 3 is being closed, and an extra arm $42'$ adapted to open switch 80 when the switch 3 closes. The opening of switch 41 disconnects the resistance 40 from the field winding so that the winding is no longer short circuited through this resistance, and the opening of switch 80 interrupts the current flowing through coil 56.

The closing of field switch 3 completes the change from starting to running condition and the motor continues to operate with full voltage applied to the armature through the running switch $2^r$; and with direct current from leads 28 and 29 supplied directly to the main field winding $f$. A voltmeter $31'$ measures the field voltage, and an ammeter 31 measures the current supplied to the field winding, this ammeter being interposed in lead 28 between the connecting switch 30 and the field switch 3. The ammeter $44'$ indicates the current supplied to the motor armature.

There are a number of features of my invention which are of considerable importance from the standpoint of protecting the motor under all conditions. For example, the overload relay $17'$, the coils of which derive their current from the current transformers 52 and 53, is adapted to open the control circuit whenever the current supplied to the motor armature through leads 10, 11, 12 becomes excessive. As soon as the connection to lead 61 of the control circuit is broken by virtue of the operation of the overload relay $17'$ current can no longer flow through the coil of the control relay 58, and the contacts 78 and 79 of this relay are immediately opened. This breaks the circuit which supplied current to coil 44 of the field switch 3, because this current flowed through contacts 78 which are no longer closed, and the field switch 3 is immediately opened. The running switch $2^r$ is also opened because of the fact that contacts 78 are opened. Thus the motor is entirely disconnected from both the high tension lines and the source of direct current connected to the field leads 28 and 29, and the motor is in condition to start upon closing the starting contacts 24.

It is to be noted that during the starting period until the full voltage switch $2^r$ is closed the operation of the overload relay $17'$ disconnects the motor from the line. The coils 54 and 55 of the starting switches $2^s$ and $2^{s'}$ are connected across the leads 61 and 62 through contacts 64 of pilot relay 57. Therefore, as soon as the overload relay $17'$ interrupts the current flowing in the control circuit the contacts 63 and 64 of the pilot relay 57 open and the current passing through coils 54 and 55 is interrupted.

Another feature of importance is the construction of the control relay 58 and the provision of contacts 90 whereby it is impossible to close the full voltage switch $2^r$ while the reduced voltage switches $2^s$ and $2^{s'}$ are closed.

This desirable result arises by virtue of the fact that contacts 78 and 79 of control relay 58 cannot close without opening contacts 66 which breaks the circuit through the coil of the pilot relay 57 and causes this relay to open. Furthermore, as pointed out above, the contacts 90 serve as an additional safeguard against inadvertent closing of the full voltage switch 2ʳ before the starting switches 2ˢ and 2ˢ′ are open.

Whenever the motor falls out of step for any reason, such as overload, on the motor or low voltage, an induced alternating current flows in the motor field winding and the frequency relay 4 immediately closes thus breaking the circuit through the coil 44 of the field switch 3 which causes the switch to open. The motor continues to operate just as though it was being started. If the motor speed cannot come up to a value sufficient to open frequency relay 4 and apply the field excitation, the current supplied to the motor will become excessive and operate the overload relay to disconnect the motor from the line. If the condition which causes the motor to fall out of step is only temporary and the motor load is removed, the motor speed will increase and the full excitation will be applied just as though the motor was being started.

Whenever it is desired to stop the motor it is merely necessary to open switch 25, thus breaking the control circuit. This switch can be an ordinary push-button switch arranged at any convenient point. The motor is in full control of the operator at all times, even during the starting period, for the motor can be completely disconnected from the line at any time by merely opening switch 25. It will be noted that during the starting period the current in the control circuit flows through the contacts of switch 25 both before and after the relays 57 and 58 are closed.

Another feature of my invention consists in the provision of an auxiliary switch 84, one terminal of which is connected to lead 61 and the other terminal of which is connected to contact 85 which forms one of the poles of the double throw switch 60. The switch 84 can be closed by a pressure gauge, float or other means, whereby the motor is started automatically thus avoiding the necessity of closing the contact 24 in order to start the motor. The switch 84 is put into operative condition by throwing the double throw switch 60 up so as to connect the contact 85 with lead 65 through the normally closed switch 25. Thus, whenever the switch 84 is closed, the current from lead 61 of the control circuit is supplied to the coil of the pilot relay 57 through contact 85, switch 25, lead 65′, leads 67′ and 67, closed contacts 66, and lead 62.

From the above description it will be apparent that my invention includes an arrangement of comparatively simple parts whereby a synchronous motor or similar machine can be started with the assurance that the motor will be protected under all conditions. This result is obtained by using two frequency relays, a pilot relay and a control relay. One frequency relay is connected permanently in the field circuit and serves to apply the field current when the motor speed increases to a predetermined value and to open the field switch should any condition arise which would cause the motor to pull out of step. The other frequency relay, connected in the control circuit, determines the instant at which the full voltage switch is closed and the reduced voltage switch is opened. This step in the starting operation should occur when the motor has reached approximately one-half synchronous speed. It is, of course, possible to adjust this second frequency relay 59 so as to perform the desired operations when the motor speed reaches any desired value. An important feature in connection with the frequency relay 59 is the provision of a balancing resistance 72 connected across the coil of this relay. This resistance furnishes a path for the induced field current when the frequency of this current is high and it is only when the frequency is reduced to a predetermined value that enough current flows through the coil of the relay 59 to cause the armature 75 of this relay to move to its closed position. When the relay 4 operates to apply the full current the connection through the coil of the frequency relay 59 is broken as well as the connection through the resistance unit 40. Therefore, as long as the source of direct current is connected to the field leads 33 and 34 no current flows through the resistance elements 40 and 72 and the coil 59′ of the relay 59.

The two relays 57 and 58 are simple in construction and thoroughly reliable. The pilot relay 57 contains two sets of contacts, one of which serves as a seal around starting switch 24 and the other of which serves to supply current to the coils 54 and 55 of the reduced voltage switches 2ˢ and 2ˢ′. The control relay 58 includes three sets of contacts; one set 66 being normally closed until current is supplied to the coil of this relay. These normally closed contacts form an interlocking connection between the pilot relay and the control relay so that the control relay cannot operate without releasing the pilot relay. This is desirable in order to prevent the full voltage switch from being closed until the reduced voltage switches are open. The second set of contacts 79 of the control relay 58 form a seal around the contacts 73 of the frequency relay 59 and the third set of contacts 78 of the control relay 58 serves to supply current to the coil 56 of the running switch 2$^r$ which applies full voltage to the motor.

I have found the use of a latch magnet adapted to hold the switch 2$^r$ in closed position to be of considerable value inasmuch as it materially reduces the amount of energy required to hold this switch in its closed position. It will be understood that as soon as contacts 78 of control relay 58 are closed, current is supplied to the main coil 56 of switch 2$^r$ whereupon this switch is caused to close. As soon as this switch closes, contacts 86 close and current is supplied to the coil 56' of the small latch magnet which holds switch 2$^r$ in its closed position. Then as soon as the frequency relay 4 operates to close the field switch 3, the switch 80 is open, thus interrupting the flow of current thru coil 56 of the electromagnetic switch 2$^r$. Current continues to flow in the coil 56' of the latch magnet, however, thus preventing the switch 2$^r$ from opening until the current in this coil 56' is interrupted. When the motor is operating normally, the latch magnet coil 56' and the coil 44 of the electromagnetic field switch 3 are connected in parallel with each other and in series with the contacts 78 of the control relay 58.

I have illustrated my invention as applied to its use in connection with a synchronous motor connected to a high tension line. Accordingly I have shown a control circuit separate from the high tension supply line; but it will be understood that where the starting system is to be used with a motor connected to a low tension line it is not necessary to have a separate source of energy for the control circuit. The control circuit can be connected directly across two of the low tension leads. It is also to be understood that my invention can be used with apparatus other than synchronous motors although it is of most value perhaps when used with synchronous motors. It can be used with rotary converters, alternators and synchronous machines of all types and therefore, the invention is not limited in this respect.

The arrangement and manner of connecting the various parts of my improved system can be varied without departing from the spirit of the invention which is not limited to the particular embodiment illustrated and described but includes such modifications thereof as fall within the scope of the appended claims.

I claim:

1. In a system of the type described, the combination of a motor having an armature winding, an electromagnetic switch for applying reduced voltage to the armature winding, a switch for applying full voltage to the armature winding, a control circuit, a pilot relay having an actuating coil connected in the said circuit and having two sets of contacts, a manually operable switch for closing the control circuit thru said pilot relay, and a control relay connected to said circuit and adapted to energize the said full voltage switch and having a plurality of sets of contacts, one set being normally closed when the circuit thru said control relay is broken and open when current is supplied to the control relay; one set of contacts of the pilot relay being connected across said manually operable switch and in series with the normally closed contacts of said control relay and with the actuating coil of said pilot relay, and the other set of contacts of the pilot relay being connected so that upon closing they supply current to the low voltage electromagnetic switch.

2. In a system of the type described, the combination of a motor having an armature winding and a field winding, an electromagnetic switch for applying reduced voltage to the armature winding, a switch for applying full voltage to the armature winding, a control circuit, a pilot relay connected in the said circuit and having two sets of contacts, a manually operable switch for closing the control circuit thru said pilot relay, and a control relay connected to said circuit and adapted to energize the said full voltage switch and having a plurality of sets of contacts, one set being normally closed when the circuit thru said control relay is broken and open when current is supplied to the control relay; one set of contacts of the pilot relay being connected across said manually operable switch and in series with the normally closed contacts of said control relay, and the other set of contacts of the pilot relay being connected so that upon closing they supply current to the low voltage electromagnetic switch; and means operated solely by the current of decreasing frequency induced in the field winding for positively closing the control circuit through the control relay whereby full voltage is applied to the armature winding and the current supplied to the pilot relay is interrupted.

3. In a system of the type described, the combination of a motor having an armature winding and a field winding, an electromagnetic switch for applying reduced voltage to the armature winding, a switch for applying full voltage to the armature winding, a control circuit, a pilot relay connected in said circuit, and having two sets of contacts, a manually operable switch for closing the control circuit thru said pilot relay, a frequency relay having contacts connected to said control circuit, the said frequency relay being operated solely by the current induced in the motor field winding, and a control relay connected to said circuit and having three sets of contacts, one set being normally closed until current is supplied to said control relay, one set adapted upon closing to form a shunt around the contacts of said frequency relay, and the third set of contacts being adapted upon closing to supply current to the full voltage switch, the said frequency relay being adapted upon closing to supply current to said control relay; one set of contacts of the pilot relay being connected across said manually operable switch and in series with the normally closed contacts of said control relay and with the actuating coil of said pilot relay, and the other set of contacts of the pilot relay being connected so that upon closing they supply current to the low voltage electromagnetic switch.

4. In a system of the type described, the combination of a motor having an armature winding, and a field winding, an electromagnetic switch for applying reduced voltage to the armature winding, an electromagnetic switch for applying full voltage to the armature winding, automatically operating means for actuating said low voltage switch to apply reduced voltage to the armature winding, a control relay adapted to actuate said full voltage switch, a frequency relay adapted to supply current to said control relay, a resistance element normally connected in series with the field winding until the excitation current is supplied to the field winding, and means for connecting said frequency relay across said resistance element until the motor speed reaches a predetermined value near synchronous speed.

5. In a system of the type described, the combination of a motor having an armature winding and a field winding, an electromagnetic switch for applying reduced voltage to the armature winding, an electromagnetic switch for applying full voltage to the armature winding, automatically operating means for actuating said low voltage switch to apply reduced voltage to the armature winding, a control relay adapted to actuate said full voltage switch, a frequency relay adapted to supply current to said control relay, a resistance element normally connected in series with the field winding until the excitation current is supplied to the field winding; and means responsive to the frequency of the current induced in the motor field winding for connecting the said relay across said resistance element.

6. In a system of the type described, the combination of a motor having an armature winding, and a field winding, an electromagnetic switch for applying reduced voltage to the armature winding, an electromagnetic switch for applying full voltage to the armature winding, automatically operating means for actuating said low voltage switch to apply reduced voltage to the armature winding, a control relay adapted to actuate said full voltage switch, a frequency relay adapted to supply current to said control relay, a resistance element normally connected in series with the field winding until the excitation current is supplied to the field winding; and means responsive to the frequency of the current induced in the motor field winding for connecting the said relay across said resistance element; and for disconnecting said frequency relay when the motor speed reaches a predetermined value near synchronous speed.

7. In a system of the type described, the combination of a motor having an armature winding and a field winding, an electromagnetic switch for applying reduced voltage to the armature winding, an electromagnetic switch for applying full voltage to the armature winding, automatically operating means for actuating said low voltage switch to apply reduced voltage to the armature winding, a control relay adapted to actuate said full voltage switch, a frequency relay adapted to supply current to said control relay, a resistance element normally connected in series with the field winding until the excitation current is supplied to the field winding; and a frequency relay connected at all times to the motor field winding and adapted to connect said first mentioned frequency relay to the field circuit as soon as current is supplied to the armature winding and to disconnect this frequency relay when the motor speed reaches a predetermined value near synchronous speed, the said frequency relay connected permanently in the field circuit also being adapted to connect the motor field winding to a source of excitation current when the motor speed reaches the predetermined value.

8. In a system of the type described, the combination of a motor having an armature winding and a field winding, an electromagnetic switch for applying reduced voltage to the armature winding, a switch for applying full voltage to the armature winding, a control circuit, a pilot relay connected in the said circuit and having two sets of contacts, a manually operable switch for closing the control circuit thru said pilot relay, a switch operated by said reduced voltage switch so as to be closed when the reduced voltage switch is open, and a control relay connected to said circuit and adapted to close the circuit thru the switch operated by the low voltage switch to supply full voltage to the armature winding and having a plurality of sets of contacts, one set being normally closed when the circuit thru said control relay is broken and open when current is supplied to the control relay; one set of contacts of the pilot relay being connected across said manually operable switch in series with the normally closed contacts of said control relay, and the other set of contacts of the pilot relay being connected so that upon closing they supply current to the low voltage electromagnetic switch; and means responsive to the frequency of the induced current in the field winding for supplying current to said control relay whereby full voltage is applied to the armature winding and the current supplied to the pilot relay is interrupted.

9. In a system of the type described, the combination of a motor having an armature winding and a field winding, an electromagnetic switch for applying reduced voltage to the armature winding, a switch for applying full voltage to the armature winding, an automatically operated field switch, a control circuit, a pilot relay connected in the said circuit and having two sets of contacts, a manually operable switch for closing the control circuit thru said pilot relay, a switch operated by said field switch so as to be open when said field switch is closed, a switch operated by said low voltage switch so as to be closed when said low voltage switch is open, and a control relay connected to said circuit and adapted to close said circuit thru the switches operated by said field switch and said low voltage switch to supply full voltage to the armature winding, said control relay having a set of contacts normally closed when the circuit thru said control relay is broken and open when current is supplied to the control relay; one set of contacts of the pilot relay being connected across said manually operable switch in series with the normally closed contacts of said control relay, and the other set of contacts of the pilot relay being connected so that upon closing they supply current to the low voltage electromagnetic switch; and means responsive to the frequency of the induced current in the field winding for supplying current to said control relay whereby full voltage is applied to the armature winding and the current supplied to the pilot relay is interrupted.

10. In a system of the type described, the combination of a motor having an armature winding and a field winding, an electromagnetic switch for applying reduced voltage to the armature winding, an electromagnetic switch for applying full voltage to the armature winding, a latch magnet for said full voltage switch, a control circuit, a pilot relay connected in said circuit and having two sets of contacts, a manually operable switch for closing the control circuit thru said pilot relay, an electromagnetic field switch, a switch operated by said field switch so as to be closed when said field switch is open, a switch operated by said reduced voltage switch so as to be closed when said reduced voltage switch is open, and a control relay connected to said circuit and adapted to supply current to said full voltage switch thru the switches operated by said field switch and said reduced voltage switch and to supply current to said latch magnet, said control relay having a set of contacts normally closed when the circuit thru said relay is broken and open when the current is supplied to the control relay; one set of contacts of the pilot relay being connected across said manually operable switch in series with the normally closed contacts of said control relay, and the other set of contacts of the pilot relay being connected so that upon closing they supply current to the low voltage electromagnetic switch; and means responsive to the frequency of the induced current in the field winding for supplying current to said control relay whereby full voltage is applied to the armature winding and the current supplied to the pilot relay is interrupted.

11. In a system of the type described, the combination of a motor having an armature winding and a field winding, an electromagnetic switch for applying reduced voltage to the armature winding, an electromagnetic switch for applying full voltage to the armature winding, a latch magnet for said full voltage switch, an electromagnetic field switch, a control circuit, a pilot relay connected in said circuit and having two sets of contacts, a switch for closing the control circuit thru said pilot relay, a switch operated by said field switch so as to be open when the field switch is closed, a switch operated by said low voltage switch so as to be closed when said low voltage switch is open, a switch operated by said full voltage switch so as to be open when said full voltage switch is open, and a control relay connected to said circuit and adapted to supply current to said full voltage switch thru the switches operated by said field switch and said low voltage switch and to supply current to said latch magnet thru the switch operated by said full voltage switch, said control relay having a set of contacts normally closed when the circuit thru said control relay is broken and open when current is supplied to the control relay; one set of contacts of the pilot relay being connected across said manually operable switch in series with the normally closed contacts of said control relay, and the other set of contacts of the pilot relay being connected so that upon closing they supply current to the low voltage electromagnetic switch; and means responsive to the frequency of the induced current in the field winding for supplying current to said control relay whereby full voltage is applied to the armature winding and the current supplied to the pilot relay is interrupted.

In testimony whereof I affix my signature.

CHARLES TRUMAN HIBBARD.